United States Patent
Agarwal et al.

(10) Patent No.: US 9,183,032 B2
(45) Date of Patent: Nov. 10, 2015

(54) METHOD AND SYSTEM FOR MIGRATION OF MULTI-TIER VIRTUAL APPLICATION ACROSS DIFFERENT CLOUDS HYPERVISOR PLATFORMS

(71) Applicants: Prashant Agarwal, Noida (IN); Akhilesh Chandra Singh, Noida (IN); Dhanyamraju S U M Prasad, Hyderabad (IN); Hareendran Madhavan Pillai, Chennai (IN); Haroon Rasheed, Madurai (IN)

(72) Inventors: Prashant Agarwal, Noida (IN); Akhilesh Chandra Singh, Noida (IN); Dhanyamraju S U M Prasad, Hyderabad (IN); Hareendran Madhavan Pillai, Chennai (IN); Haroon Rasheed, Madurai (IN)

(73) Assignee: HCL Technologies Limited, Chennai, Tamil Nadu (IN)

( * ) Notice: Subject to any disclaimer, the term of this patent is extended or adjusted under 35 U.S.C. 154(b) by 110 days.

(21) Appl. No.: 13/654,874

(22) Filed: Oct. 18, 2012

(65) Prior Publication Data
US 2014/0115161 A1    Apr. 24, 2014

(51) Int. Cl.
*G06F 15/173* (2006.01)
*G06F 9/455* (2006.01)
*G06F 11/34* (2006.01)
*H04L 12/24* (2006.01)
*G06F 9/50* (2006.01)

(52) U.S. Cl.
CPC .......... *G06F 9/45558* (2013.01); *G06F 9/5072* (2013.01); *G06F 11/3428* (2013.01); *G06F 11/3447* (2013.01); *H04L 41/0803* (2013.01); *H04L 41/18* (2013.01); *G06F 2009/4557* (2013.01)

(58) Field of Classification Search
USPC .................................................. 709/226, 223
See application file for complete search history.

(56) References Cited

U.S. PATENT DOCUMENTS 8,271,653 B2 * 9/2012 DeHaan ........................ 709/226
2013/0332588 A1 * 12/2013 Maytal et al. ................ 709/223

* cited by examiner

*Primary Examiner* — Kyung H Shin

(57) ABSTRACT

A method and system for migration of multi-tier virtual application across different clouds hypervisor platforms. The principal object of the embodiment is to provide migration of multi-tier virtual application from one vendor to another vendor cloud platforms. Another object of the embodiment is to convert entire multi-tier virtual application of a source vendor cloud platforms, along with the virtual machines, configuration and properties into a format suitable for a destination vendor cloud platforms. Another object of the embodiment is to verify the migrated application after completion of conversion and migration.

8 Claims, 5 Drawing Sheets

METHOD AND SYSTEM FOR MIGRATION OF MULTI-TIER VIRTUAL APPLICATION ACROSS DIFFERENT CLOUDS HYPERVISOR PLATFORMS

The present application is based on, and claims priority from, IN Application Number 2853/CHE/2012, filed on Jul. 13, 2012, the disclosure of which is hereby incorporated by reference herein.

TECHNICAL FIELD

This application relates to multi-tier application migration across different cloud computing hypervisor platforms.

BACKGROUND

With advances in hardware virtualization and computing along with availability of high capacity networks, cloud computing is emerging as the future of computing technology. Cloud computing provides access to third party software and services on web and generally has a pay as per usage basis system. End users access the cloud applications using appropriate application programming interfaces.

There are several vendors providing cloud platforms. Even though cloud computing provides end users with a lot of advantages, the lack of interoperability between different cloud vendors restricts end users from using services of other cloud vendors. Each vendor, currently in the fray, have their own formats and data model for the application deployment and management in cloud, leading to vendor locking and prohibits user from using cloud services of other vendors. Also due to lack of standardization in cloud computing, each vendor cloud operates and stores applications and data in different manner. The technology used in each vendor cloud platform is also different. Users find it difficult to process/migrate/share applications between two clouds. Although migration tools are available for migrating virtual machines from one hypervisor or cloud to a destination hypervisor or cloud, complex multi-tier applications may not migrate completely as completely different formats may be used in the destination hypervisor or cloud and applications may be running on multiple virtual machine with different properties and configurations.

SUMMARY

The principal object of the embodiment is to provide migration of multi-tier virtual application from source cloud platform, along with the Application configuration and properties into a format suitable for a destination vendor cloud platform.

Another object of the embodiment is to verify the migrated application after completion of conversion and migration.

Accordingly, the embodiment provides a method for migrating at least one application from a source cloud to a target cloud using a migration server, the method comprising of creating a source application package by the source cloud, wherein the source application package comprises of all virtual machines and configurations associated with the migrating application; exporting the source application package by the source cloud to the migration server; converting the source package application into a target application package compatible with target cloud by the migration server; sending the target application package to the target cloud by the migration server; and launching and verifying the migrated application by the migration server.

Also, disclosed herein is a migration server for migrating at least one application from a source cloud to a target cloud, the migration server comprising of a virtual machine migration tool for migrating virtual machines; a mapping table for finding equivalence of Application Properties and Configurations format elements between source and target clouds; and conversion tool for constructing the source applications package into a target application package compatible with target cloud.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE FIGURES

This embodiment is illustrated in the accompanying drawings, throughout which like reference letters indicate corresponding parts in the various figures. The embodiments herein will be better understood from the following description with reference to the drawings, in which.

DETAILED DESCRIPTION OF EMBODIMENTS

The embodiments herein, the various features, and advantageous details thereof are explained more fully with reference to the non-limiting embodiments that are illustrated in the accompanying drawings and detailed in the following description. Descriptions of well-known components and processing techniques are omitted to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
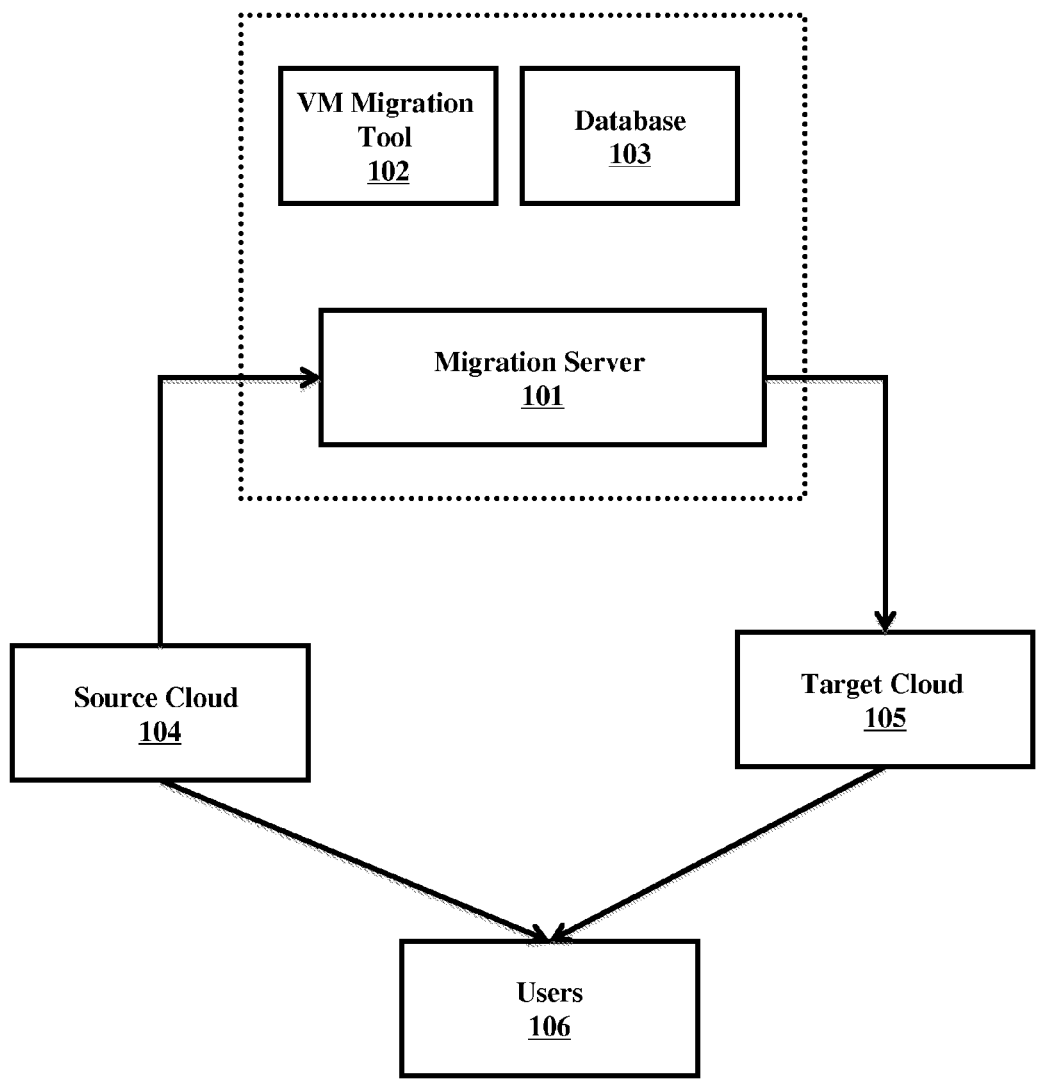
FIG. 1 illustrates a broad block diagram showing the system used for application migration between clouds, according to the embodiments as disclosed herein.

FIG. 1 illustrates a broad block diagram showing the system used for application migration between clouds, according to the embodiments as disclosed herein. The users 106 of the source cloud 104 identify applications to migrate to the target cloud. The virtual machines and configuration associated are packaged together and sent to the migration server 101. With the help of VM Migration tool 102, the Migration server 101 converts the virtual machines associated with the application. Migration Server 101 extracts the application configurations. Database 103 is used for storing the extracted application configurations. The migration server 101 is connected to the source cloud 104 and target cloud 105. A mapping table in the migration server 101 is used for matching the corresponding properties in the target cloud 105. The application exported from the source cloud 104 gets migrated to a format compatible with target cloud 105 and a target application package is created, which is then opened in the target cloud 105. The application is opened and verified.

Figure 2:
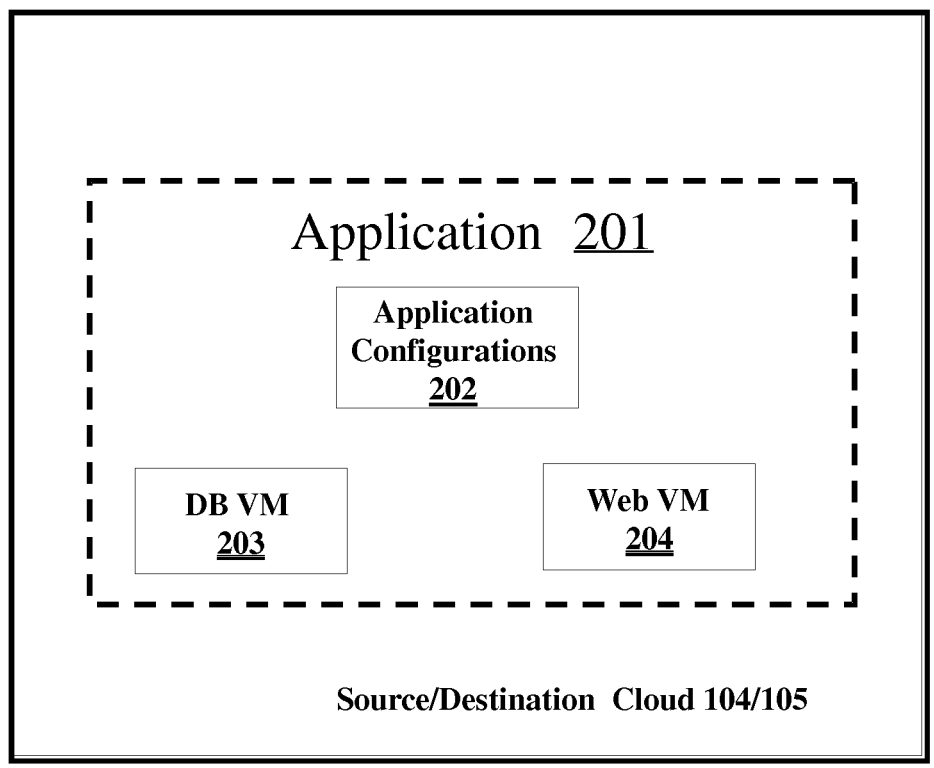
FIG. 2 illustrates a block diagram showing the components of a cloud platforms, according to embodiments disclosed herein.

FIG. 2 illustrates a block diagram showing the components of a typical two-tier application in the cloud, according to embodiments disclosed herein. The application 201 comprises of a Web VM 204, and a DB VM 203 along with application configurations 202. Users can access the application using Web VM 204, and the DB VM 203 contains all the application data stored by user.

Figure 3:
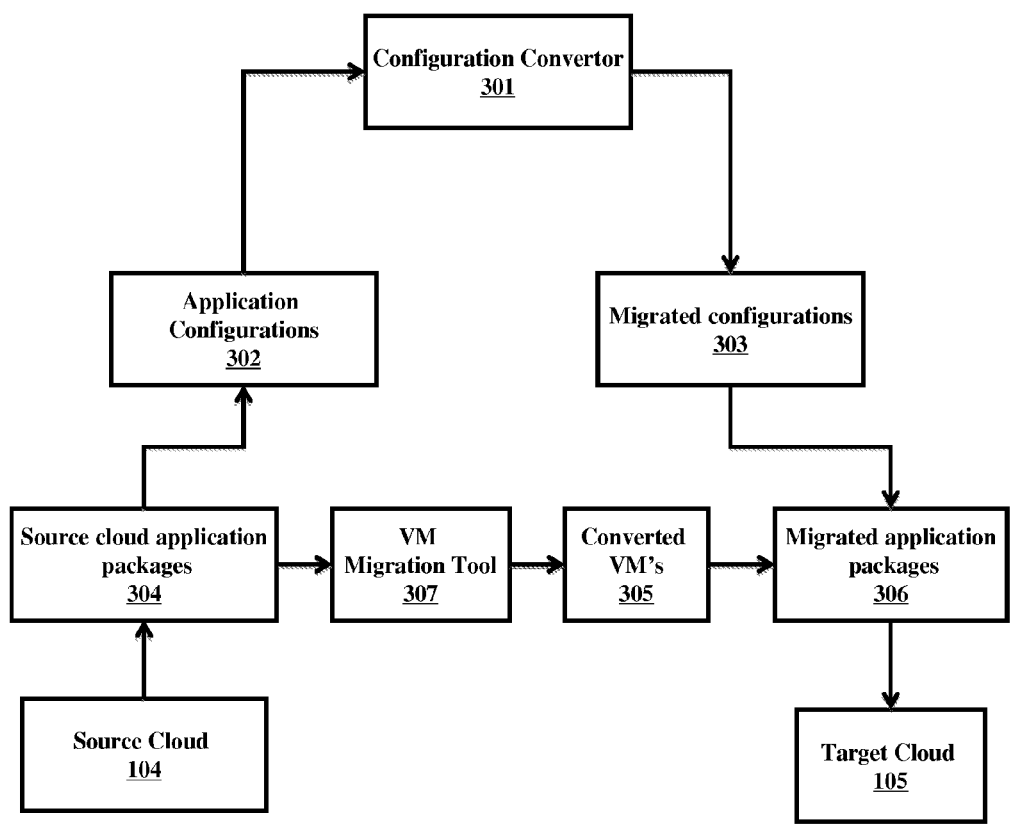
FIG. 3 illustrates a block diagram showing all the blocks of the system used for application migration between clouds, according to the embodiments as disclosed herein.

FIG. 3 illustrates a block diagram showing all the blocks of the system used for application migration between clouds, according to the embodiments as disclosed herein. The application to be migrated is selected from the source cloud. The virtual machine associated with the application and all application level configurations are gathered together. The entire application is exported to a logical container and the exported application is transferred to the migration server as a package called source cloud application packages 304. In the migration server, the virtual machines, virtual machine application properties and application configurations 302 are extracted from source cloud application package. The next step in the method is migrating of the virtual machines. A VM Migration tool 307 is used for migrating the virtual machines to the target cloud. Configuration convertor 301 is used to convert and migrate the application configuration compatible to target cloud. The migrated 305 virtual machines along with the migrated application configurations 303 are used to construct corresponding migrated application package in the target cloud platform. The migrated application package is used for launching 405 the application in the target cloud 105.

Figure 4:
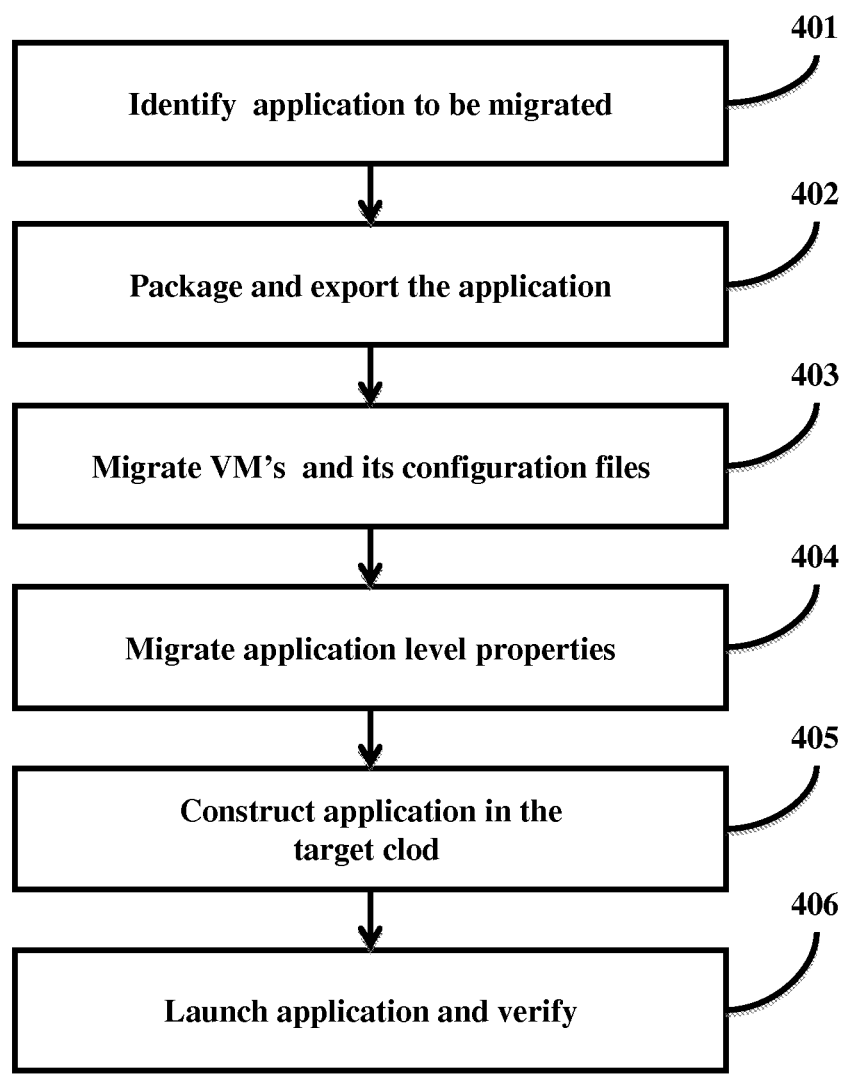
FIG. 4 is a flowchart describing the method of migrating an application from a source cloud platform of one vendor to a destination cloud platform of another vendor, according to the embodiments as disclosed herein.
Figure 5:
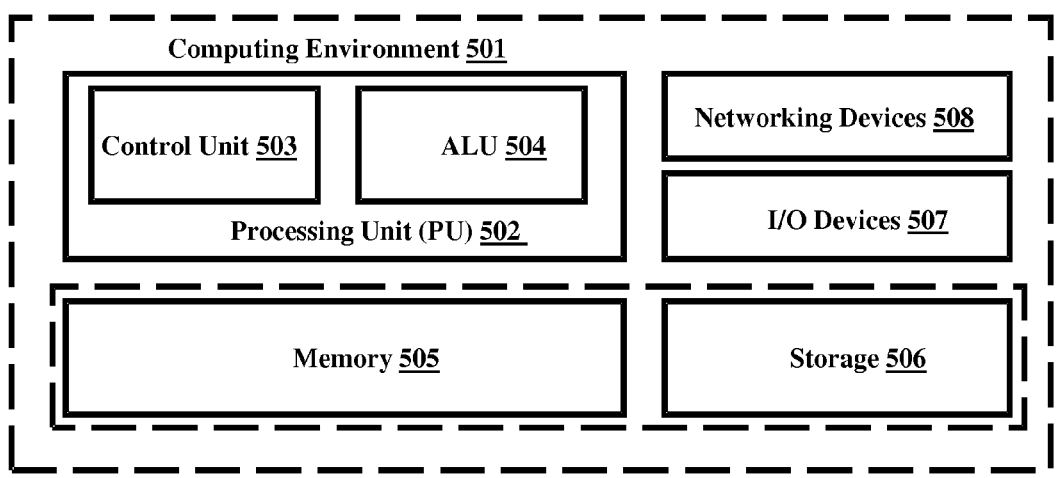
FIG. 5 illustrates a computing environment implementing the application, according to embodiments disclosed herein.

FIG. 4 is a flowchart describing the method of migrating an application from a source cloud of one vendor to a destination cloud of another vendor, according to the embodiments as disclosed herein. The method beings by identifying (401) the application to be migrated. The virtual machine associated with the application and all application level configurations are gathered together. The entire application is exported (402) to a logical container. The exported application is transferred to the migration server as a package. In the migration server, the virtual machines and, application properties are extracted from the exported application. The next step in the method is migrating (403) of the virtual machines and its configuration. A VM Migration tool is used for migrating (404) the virtual machines to the target cloud. After virtual machines migration, migration of application level properties is done. From the application package, application level properties are extracted. Once the properties are extracted, corresponding properties in the target cloud are identified and transferred to the target cloud application. The migrated virtual machines and the migrated application properties are then used for constructing (405) the application in the target cloud. Finally, the application is launched (406) in the target cloud and verified. The various actions in method 400 may be performed in the order presented, in a different order or simultaneously. Further, in some embodiments, some actions listed in FIG. 4 may be omitted FIG. 5 illustrates a computing environment implementing the application, according to embodiments disclosed herein. As depicted the computing environment 501 comprises at least one processing unit 502 that is equipped with a control unit 503 and an Arithmetic Logic Unit (ALU) 504, a memory 505, a storage unit 506, plurality of networking devices 508 and a plurality Input output (I/O) devices 507. The processing unit 502 is responsible for processing the instructions of the algorithm. The processing unit 502 receives commands from the control unit 503 in order to perform its processing. Further, any logical and arithmetic operations involved in the execution of the instructions are computed with the help of the ALU 504.

The overall computing environment 501 can be composed of multiple homogeneous and/or heterogeneous cores, multiple CPUs of different kinds, special media and other accelerators. The processing unit 502 is responsible for processing the instructions of the algorithm. Further, the plurality of process units may be located on a single chip or over multiple chips.

The algorithm comprising of instructions and codes required for the implementation are stored in either the memory unit 505 or the storage 506 or both. At the time of execution, the instructions may be fetched from the corresponding memory 505 and/or storage 506, and executed by the processing unit 502.

In case of any hardware implementations, various networking devices or external I/O devices may be connected to the computing environment 501 to support the implementation through the networking unit 508 and the I/O device unit 507.

The embodiments disclosed herein can be implemented through at least one software program running on at least one hardware device and performing network management functions to control the elements. The elements shown in FIG. 1 include modules, which can be at least one of a hardware device, or a combination of hardware device, and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. A method for migrating at least one application from a source cloud to a target cloud using a migration server, said method comprising:
    identifying a source application package by said source cloud, wherein said source application package comprises of all virtual machines and all application level configurations associated with said migrating application;
    exporting to a logical container the source application package by said source cloud to said migration server;
    extracting at least application configurations from the exported application by said migration server;
    converting, by a configuration convertor, the source package application into a target application package compatible with target cloud by said migration server, wherein said target application package is constructed using the extracted application configurations in the target cloud platform;

sending the target application package to the target cloud by said migration server;

launching said target application by said migration server, wherein said launching is configured to be performed in at least one of a given order, a different order and simultaneously; and verifying said migrated target application by said migration server, wherein said verifying is configured to comprise at least matching at least a corresponding property in said target cloud with said source cloud, by a mapping table in said migration server.

2. The method as in claim 1, further comprising migrating virtual machines by a virtual machine migration tool.

3. The method as in claim 1, said method further comprising:

migrating virtual machines by at least a virtual machine migration tool;

finding equivalence of Application Properties and Configurations format elements between source and target clouds by at least a mapping table; and constructing said source applications package into a target application package compatible with said target cloud by at least a conversion tool.

4. The method as in claim 1, said method further comprising adapting said server to be deployed independently of said source cloud and said target cloud.

5. A system for migrating at least one application from a source cloud to a target cloud using a migration server, said system configured for:

identifying a source application package by said source cloud, wherein said source application package comprises of all virtual machines and all application level configurations associated with said migrating application;

exporting to a logical container the source application package by said source cloud to said migration server;

extracting at least application configurations from the exported application by said migration server;

converting, by a configuration convertor, the source package application into a target application package compatible with target cloud by said migration server, wherein said target application package is constructed using the extracted application properties in the target cloud platform;

sending the target application package to the target cloud by said migration server;

launching said target application by said migration server, wherein said launching is configured to be performed in at least one of a given order, a different order and simultaneously; and verifying said migrated target application by said migration server, wherein said verifying is configured to comprise at least matching at least a corresponding property in said target cloud with said source cloud, by a mapping table in said migration server.

6. The system as in claim 5, said system comprising:

at least a hardware processor; and at least a non-transitory storage medium having a computer program code, wherein said computer program code causes said hardware processor to:

migrate virtual machines by at least a virtual machine migration tool;

find equivalence of Application Properties and Configurations format elements between source and target clouds by at least a mapping table; and construct said source applications package into a target application package compatible with said target cloud by at least a conversion tool.

7. The system as in claim 5, wherein said server is adapted to be deployed independently of said source cloud and said target cloud.

8. The system as in claim 5, wherein said migration server further comprises a virtual machine migration tool for migrating virtual machines.

\* \* \* \* \*